(12) United States Patent
Etheredge et al.

(10) Patent No.: US 8,301,555 B2
(45) Date of Patent: Oct. 30, 2012

(54) PRE-APPROVED CUSTOMER ACCEPTANCE VALIDATION

(75) Inventors: Craig Etheredge, Ponte Vedra Beach, FL (US); Jason E. Fore, Jacksonville, FL (US); Ralph M. Evans, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 12/696,641

(22) Filed: Jan. 29, 2010

(65) Prior Publication Data

US 2011/0191156 A1   Aug. 4, 2011

(51) Int. Cl.
   *G06Q 40/00* (2012.01)
(52) U.S. Cl. .......................................................... 705/38
(58) Field of Classification Search ...................... 705/38
   See application file for complete search history.

(56) References Cited

U.S. PATENT DOCUMENTS

| | | | |
|---|---|---|---|
| 2003/0055727 A1* | 3/2003 | Walker et al. | 705/14 |
| 2008/0164307 A1* | 7/2008 | Silverstein | 235/380 |
| 2008/0249873 A1* | 10/2008 | Seelinger | 705/14 |
| 2009/0287556 A1* | 11/2009 | Beirne et al. | 705/14.17 |

* cited by examiner

*Primary Examiner* — Jessica Lemieux
(74) *Attorney, Agent, or Firm* — Michael A. Springs; Moore and Van Allen, PLLC; Patrick B. Horne (57) ABSTRACT

In general, embodiments of the invention relate to systems, methods, and computer program products for producing a financial offer that is specific to a customer and storing the electronic acceptance and authentication of the acceptance in a digital medium. More particularly, embodiments of the invention relate to identifying a customer, providing a financial offer that is specific to that customer, and electronically storing both the authentication of the identity of the customer and the accompanying acceptance of the financial offer.

17 Claims, 5 Drawing Sheets

PRE-APPROVED CUSTOMER ACCEPTANCE VALIDATION

FIELD

In general, embodiments of the invention relate to systems, methods, and computer program products for capturing and recording positive proof of customer acceptance of pre-approved offers in the banking center channel.

BACKGROUND

A bank is a financial institution often licensed by a government and having primary activities in borrowing and lending. Traditionally, banks have acted as payment agents, maintaining transactional accounts, more commonly know as deposit or credit accounts, for customers. Customers have traditionally handled various business transactions in person at a branch of the bank. At these bank branch locations, transactions, including offers and acceptances, are traditionally recorded on paper and stored at the branch location by a human clerk or bank teller. Similarly, pre-approved offers for credit cards or other transaction mediums are distributed and accepted through paper records that are generally handled by mail services. Unfortunately, the process of maintaining and auditing the paper records is time-consuming, expensive, and not feasible to audit on a long term basis.

Over the course of the past two decades, the bank industry has come to rely heavily on electronic transactions. One of the most heavily used avenues for conducting electronic transactions is the automatic teller machine ("ATM"). An ATM is a computerized telecommunications device that provides the customers of a financial institution with access to financial transactions in a public space, without the need for a human clerk or bank teller. An ATM can handle nearly any function that a traditional bank teller can handle, but the ATM must ensure that each transaction is authorized and each customer identified in order to ensure that someone else has not accepted the transaction on the customer's behalf. On most modern ATMs, the customer is identified by inserting a plastic ATM card with a magnetic strip or a plastic smartcard with a chip. The ATM card or smartcard contain a unique card identifier and some security information, which can include expiration data or a card security code. Similarly, each transaction is authorized with the use of a personal identification number ("PIN").

A quick service terminal (QST) is similar to an ATM, but it is found within a bank branch. The QST is deployed in the teller lines in many banks. The QST is similar to the ATM in many functional aspects, but the QST retains an authorization method that includes the digital capture of customer signatures. In this regard, the QST is outfitted with a digital signature pad. The digital signature pad, in turn, is outfitted with a screen and digital pen. The user may authorize transactions by using the digital pen to sign his or her name to the screen. Alternatively, the digital signature pad can retain a keypad, wherein each key corresponds to a numerical value. This configuration can allow a user to either enter a personal identification number (PIN) into the signature pad in order to authorize a transaction or simply create a digital signature with the use of the digital signature pad. The QST can then digitally retain the signature for verification purposes.

Despite the incredibly varied functionality of an ATM or QST used in conjunction with a card reader or digital signature pad, a bank teller and paper records are still required for many types of transactions, including pre-approved credit offers.

BRIEF SUMMARY

In general, embodiments of the invention relate to systems, methods, and computer program products for producing a financial offer that is specific to a customer and storing the electronic acceptance and authentication of the acceptance in a digital medium. More particularly, embodiments of the invention relate to identifying a customer, providing a financial offer that is specific to that customer, and electronically storing both the authentication of the identity of the customer and the accompanying acceptance of the financial offer.

For example, in one embodiment of the invention, a banking center terminal, such as a QST, reads a user's payment device, such as a user's credit or debit card. Based on the reading of the user's payment device, the terminal provides the user with a pre-approved offer for a financial product, such as a pre-approved credit card offer. If the user indicates the desire to accept the offer, the terminal prompts the user to enter certain electronic signature data, such as for example the user's signature written on the terminal's touch screen. The terminal then communicates the user's acceptance of the offer and stores the signature data in a database where it can be later retrieved as needed, the stored signature data including, for example, the user's electronic signature and context information about when, where, and why the signature was created.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Like numbers refer to like elements throughout.

As described above, it is important to provide customer-specific offers and equally important to accurately and efficiently retain records detailing the acceptance of those offers. To that end, various aspects of the systems and methods described herein are directed toward presenting customer-specific offers to a bank customer and retaining the acceptance of those offers in a digital format. In some embodiments, the digital acceptance files are stored in a searchable database for future convenience.

In general, many of the example embodiments of the invention described herein are directed toward a particular implement where a bank customer is identified by a banking terminal where the terminal can provide the customer with a customer-specific offer after identification. The customer-specific offer can be accepted by the customer in a plurality of ways, including but not limited to entering a PIN or creating a digital signature, and the acceptance can be stored digitally in a bank database. It should be appreciated that, after an acceptance has been stored in a bank database, the database can be searched to retrieve and validate the stored acceptance.

Figure 1:
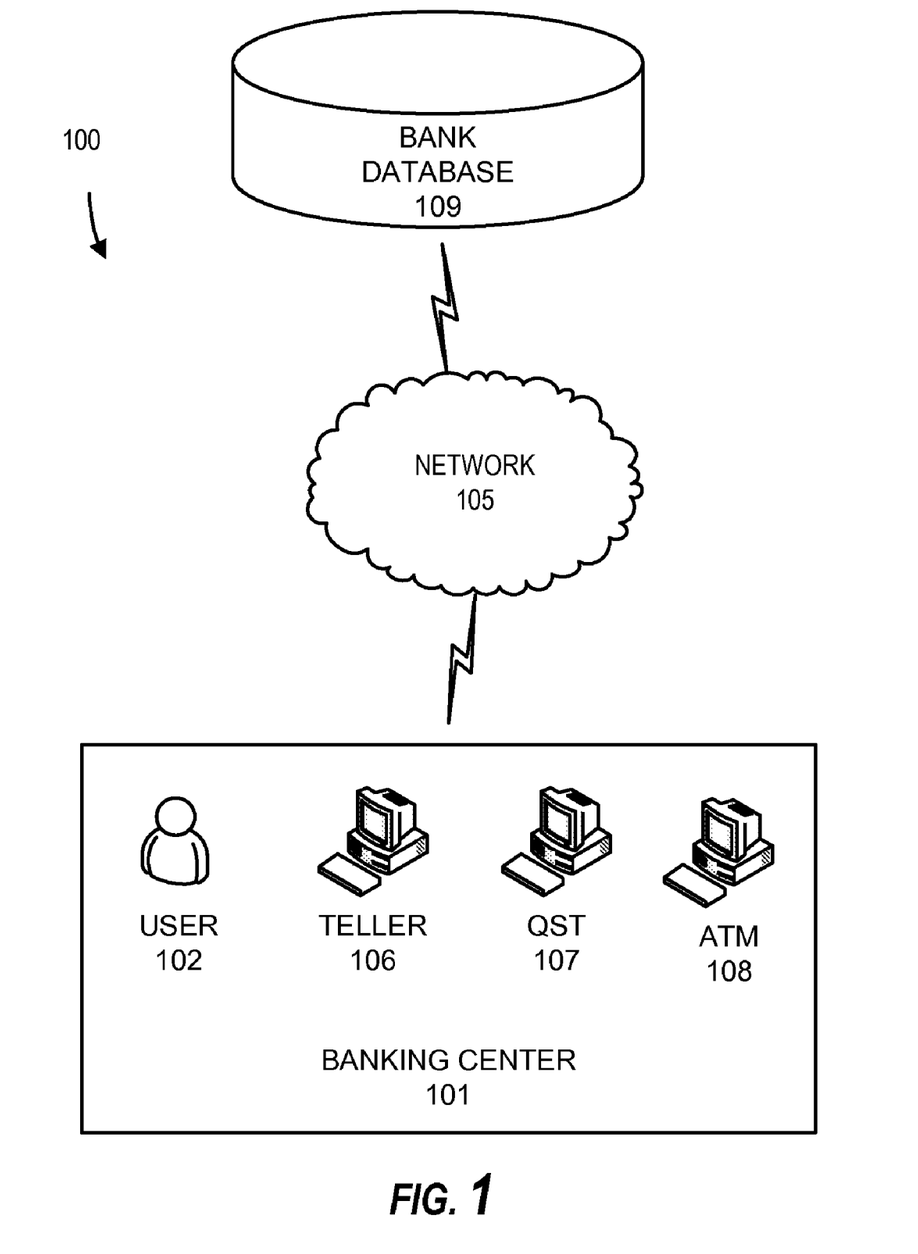
FIG. 1 is a functional block diagram illustrating an environment for practicing an embodiment of the invention.

Turning to FIG. 1, there is shown a block diagram illustrating an exemplary operating environment 100 in which the invention may be implemented in accordance with one embodiment of the invention. The operating environment 100 is only one example of a suitable operating environment and is not intended to suggest any limitation as to the scope of use or functionality of other embodiments of the present invention. Thus, other environments and configurations apparent to one of ordinary skill in the art in view of this disclosure may be employed without departing from the scope or spirit of embodiments of the present invention.

The operating environment 100 described above generally operates in a networked environment using logical connections to one or more remote computers, such as a personal computer, a server, a router, a network personal computer, and/or any other peer device. The computers will typically include most, if not all, of the elements described below in relation to computer readable medium. The logical connections could include a local area network (LAN), a wide area network (WAN), or any other wireless or wireline connection or network, such as the Internet, an intranet, and/or the like. As shown in FIG. 1, a network 105 interconnects a banking center 101 and a bank database 109.

The banking center 101 includes a variety of user terminals capable of being operated by a user 102. For example, in the illustrated embodiment of the invention, the terminals at the banking center 101 may include a teller station 106, a quick service terminal (QST) 107, an automated teller machine (ATM) 108, and/or any other similar terminal. More specifically, the banking center 101 includes any computing device capable of receiving and sending data information over a network, such as the network 105, to and/or from another computing device. The set of user terminals may include devices that are usually considered general purpose computing devices and typically connect to a network using a wired or wireless communication medium at one or more fixed locations. For example, the banking center 101 may include such devices as personal computers (PCs), laptop computers, multiprocessor systems, microprocessor-based or programmable consumer electronics, network PCs, workstations, and/or the like. The banking center 101 may generally include any device that is capable of connecting to other devices using a wired or wireless communication medium.

Terminals such as those described above will generally include communication devices such as a modem, server, and/or other device for communicating with other devices on the network 105, and/or a display, mouse, keyboard, touchpad, touch screen, microphone, speaker, and/or other user input/output devices for communicating with one or more users. In one embodiment, the communication devices include a card reader device that reads data from the magnetic strip of an ID card, debit card, bank card, and/or any other type of card with similar information. In one embodiment, the communication devices also include a digital signature pad, which may include a touch screen, touchpad, keypad, and/or the like.

Referring again to FIG. 1, the bank database 109 generally includes data tables composed of general bank information, including but not limited to account numbers, transaction histories, customer personal information, pre-approved customer offers, acceptance and authorization records relating to the pre-approved customer offers or other transactions, and/or any other similar bank information. As the bank database 109 is interconnected to the banking center 101 over the network 105, the information retained in the bank database 109 is accessible by the terminals located in the banking center 101.

Figure 2:
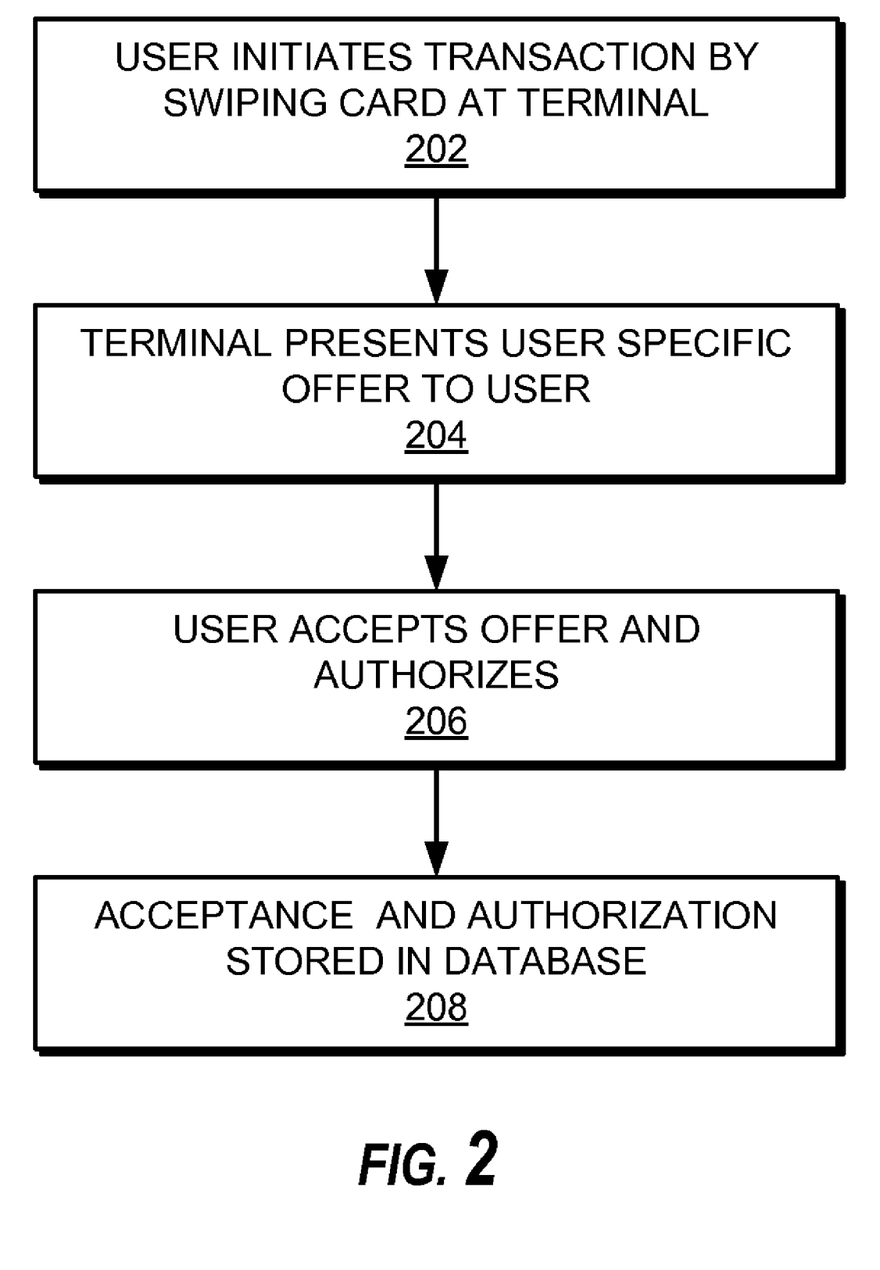
FIG. 2 is a flow diagram generally illustrating a process for offering and accepting user specific offers, in accordance with an embodiment of the invention.

FIG. 2 provides a general flow chart illustrating a process for accepting a pre-approved bank offer in accordance with one embodiment of the invention. The process 200 of FIG. 2 provides a high-level illustration of an embodiment of the invention. As described herein, the process 200 of FIG. 2 is, in one embodiment, implemented by various devices in the operating environment 100 described in FIG. 1. In other embodiments, however, the process 200 of FIG. 2 is implemented by a single computer that both contains the specific offer and stores the acceptance in a centrally located data store.

Referring to FIG. 2, as represented by block 202, the user 102 initiates the transaction by swiping his or her card at a terminal. Generally, the terminal may be a computing device, such as the user terminal 110 described above. Typically, a bank card will be swiped, however, in some embodiments, the operating environment 100 allows for a personal identification card, driver's license, or any other card capable of being read and processed by the card reader device to be used.

As represented by block 204, the data received by the card swipe in block 202 is used to present the user 102 with an offer that is specific to the user 102, which will be described in more detail below. Once the offer is displayed, the user 102 can accept the user-specific offer by creating a data signature to verify acceptance and authorization, as shown in block 206. As used herein, the term "data signature" refers to the information necessary to sufficiently verify and authorize a transaction. The data signature can include a variety of information that is broken into two segments. The first segment of the data signature includes information that can be used to distinctly identify the user 102 as the party accepting the transaction and may, for example, include information about the user 102 entering the his or her PIN on the keypad, creating a digital signature on the touch screen with the digital pen, or any other similar action. The second segment of the data signature includes information used to verify the particular situation surrounding the transaction, including, for example, the date, time, terminal number, location, and/or any other similar data. When combined, the two segments of the data signature produce a complete record that can be used to effectively prove correct authorization and validation of the transaction being completed.

The process 200 then proceeds to block 208 where the data signature representing the acceptance and verification of the completed transaction is stored in a database. In one embodiment, the data signature is stored for future reference. The stored data signature can insulate either the user 102 or the financial institution in the case that a dispute arises over the legitimacy of the transaction in question. Further, the data signature is stored in a searchable database to facilitate easy access.

Figure 3:
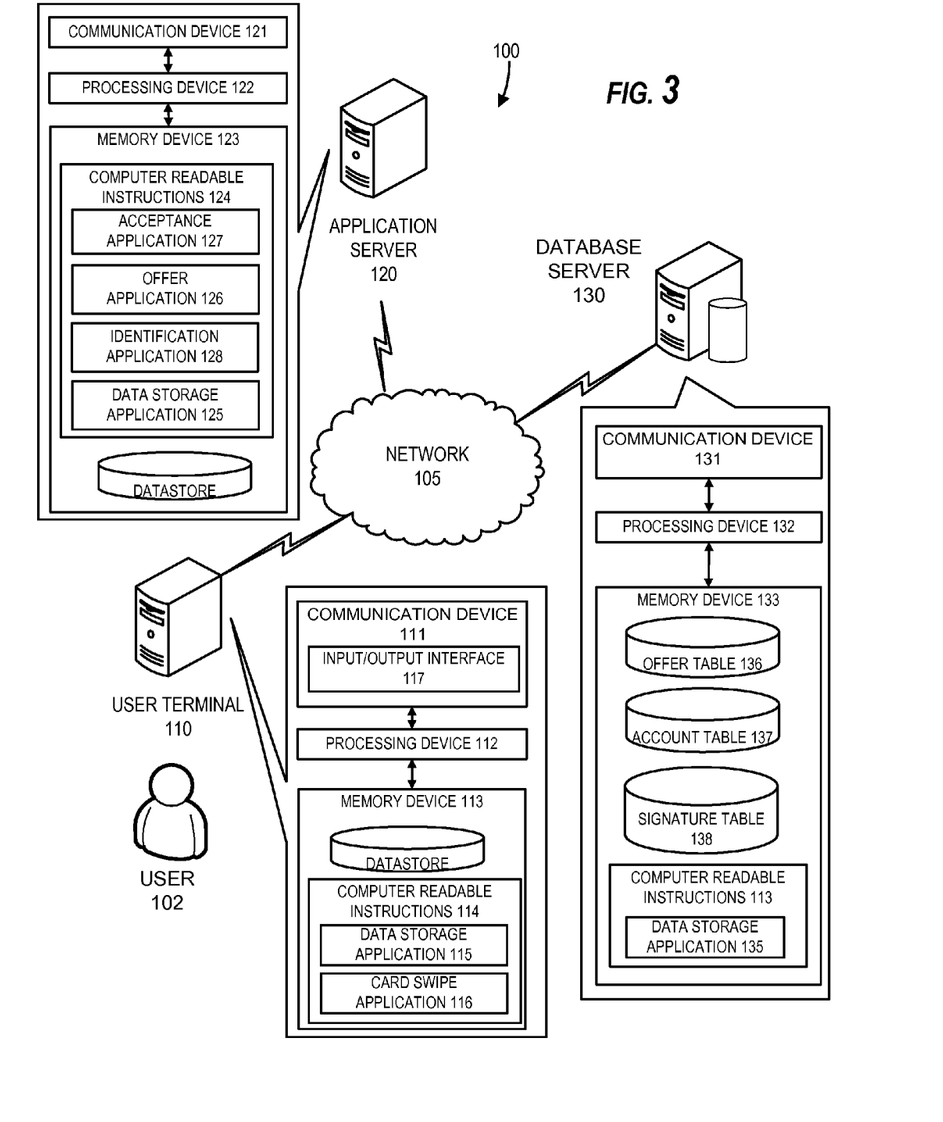
FIG. 3 is a functional block diagram illustrating an environment for practicing an embodiment of the invention.

Turning to FIG. 3, there is shown a block diagram illustrating the exemplary operating environment 100 in more detail, in accordance with one embodiment of the invention. The operating environment 100 is only one example of a suitable operating environment and is not intended to suggest any limitation as to the scope of use or functionality of other embodiments of the present invention. Thus, other environments and configurations apparent to one of ordinary skill in the art in view of this disclosure may be employed without departing from the scope or spirit of embodiments of the present invention.

As described earlier, the operating environment 100 described above generally operates in a networked environment using logical connections to one or more remote computers, such as a personal computer, a server, a router, a network personal computer, and/or any other similar device. The computers will typically include many of the elements described below in relation to the computer readable medium. The logical connections could include a local area network (LAN), a wide area network (WAN), or any other wireless or wireline connection or network, such as the Internet, an intranet, and/or the like.

As shown in FIG. 3, a network 105 interconnects a user terminal 110, an application server 120, and a database server 130. The user terminal 110 is in communication with the application server 120 and the database server 130 through the network 105. The application server 120 and the database server 130 may also be in communication with each other through the network 105.

The user terminal 110 includes any computing device capable of: (1) reading a use's credit or debit card or other payment device; (2) capturing a user's signature data; and (3) receiving and sending data information over a network, such as the network 105, to and/or from another computing device. The set of user terminals may include devices that are usually considered general purpose computing devices and typically connect to a network using a wired or wireless communication medium at one or more fixed locations. For example, the user terminal 100 may include such devices as personal computers (PCs), laptop computers, mobile devices (e.g., cell phones), multiprocessor systems, microprocessor-based or programmable consumer electronics, network PCs, workstations, and/or the like. The user terminal 110 may generally include any device that is capable of connecting to other devices using a wired or wireless communication medium.

The user terminal 110 generally includes a communication device 111, a processing device 112, and a memory device 113. The processing device 112 is operatively coupled to the communication device 111 and the memory device 113. As used herein, the term "processing device" generally includes circuitry used for implementing the communication and/or logic functions of a particular system. For example, a processing device 112 may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device 112 may include functionality to operate one or more software programs based on computer-executable program code thereof, which may be stored in the memory device 113. As used herein, a "memory device" or simply "memory" refers to a device including one or more forms of computer readable media as defined hereinbelow.

The processing device 112 uses the communication device 111 to communicate with the network 105, and other devices on the network 105, including but not limited to the application server 120 and the database 130. As used herein, a "communication device," such as the communication device 111, generally includes a modem, server, and/or other device for communicating with other devices on the network 105, and/or a display, mouse, keyboard, touchpad, touch screen, microphone, speaker, and/or other user input/output devices for communicating with one or more users. In one embodiment, the communication devices includes: (1) a card reader device that reads data from the magnetic strip of an ID card, debit card, bank card, or any other type of card with similar information, and (2) a digital signature pad, which may include a touch screen, a keypad, or the like. In this embodiment, the card reader device and digital signature pad are used in conjunction with the card swipe application 116 and the data signature application 117, which are described in more detail below.

Additionally, the communication device 111 contains an input/output interface 117. The input/output interface 117 governs input and output devices related to the user terminal 110. A user may enter commands and information into the user terminal 110 through input devices such as a card reader device, a digital signature pad, a tablet, or electronic digitizer, a microphone, a keyboard, a pointing device, commonly known as a mouse, trackball, or touchpad, or the like. In one embodiment, the user 102 may begin a transaction process by swiping an identification card through the card reader device. In a related embodiment, the user 102 may authorize a transaction by entering information on a digital signature pad. The server may also communicate with the user as the input/output interface 117 enables the use of output devices such as, but not limited to, a display monitor, speakers, a printer, or the like.

Referring again to FIG. 3, the user terminal 110 contains computer-executable program code stored in the memory device 113, which includes the computer-executable program code of a data storage application 115 and a card swipe application 116. The data storage application 115 is used to store data, such as bank card data, customer account data, image data, or virtually any other information transferable over the network 105.

The user terminal 110 may also include the card swipe application 116 that can help identify a user 102 of the terminal 110. For example, in one embodiment, the card swipe application 116 is operable to parse data received by the card reader device described above. The card swipe application 116 can recognize the card owner by parsing the name, account number, social security number, or any other piece of information from the card when the card is swiped through the card reader device. This process is used to identify the user 102 of the user terminal 110. It will be understood, in view of this disclosure, that although exemplary embodiments of the invention are described herein with reference to swiping a credit, debit, or other identification/payment card through a card reader in order to identify the user 102 at the user terminal 110, other embodiments of the invention may involve other types of identification/payment devices and readers thereof that can be used to identify the user 102 at the user terminal 110. For example, in one embodiment of the invention, the user's mobile device, such as a cell phone, is used also functions as an identification/payment device by communicating, via for example a radio-frequency identification tag or near-field-communication (NFC) device, information identifying the user and/or the user's financial account.

The user terminal 110 may further include the signature application 117 that can receive authorization data from a user 102 of the user terminal 110. For example, in one embodiment, the user 102 swipes his card in the card reader device of the user terminal 110. The card reading application 116 uses data from the swiped card to identify the owner of the card. In order to complete any transaction, the transaction must be authorized. Once a transaction has been tentatively completed, the signature application 117 can be operable to retain the authorization of the user 102 using the digital signature pad. For example, the user 102 can use his signature, PIN, or any other numerical code or written signature to authorize a transaction. The signature application 117 is operable to receive an authorization and store the authorization in a digital format.

Although FIG. 3 illustrates the user terminal 110 as one system, it should be noted that there can be one or multiple systems with one or multiple applications, each with similar components that handle a number of functions related to user activity or other user systems. It should also be noted that each of the multiple systems can be in communication with each other through the network 105 and in communication with the application server 120, the database server 130, and/or other devices connected to the network 105.

Referring again to FIG. 3, the application server 120 is generally configured to act as an intermediary between the user terminal 110 and the database server 130. The application server 120 generally includes a communication device 121, a processing device 122, and a memory device 123. The processing device 122 is operatively coupled to the communication device 121 and the memory device 123. The processing device 122 uses the communication device 121 to communicate with other devices on the network 105, including but not limited to, the user terminal 110 and the database server 130. As such, the communication device 121 generally includes a modem, server, and/or other device for communicating with other devices on the network 105.

As further illustrated by FIG. 3, the application server 120 contains computer executable program code stored in a memory device 123, which includes the computer executable program code of a data storage application 125, an offer application 126, an acceptance application 127, and an identification application 128. The data storage application 125 is used to store data, such as bank card information, customer account information, data signature information, or virtually any other information transferable over the network 105. The stored data may be captured from the user terminal 110 or the database server 130.

The identification application 128 is used to match the user 102 to a customer account that is stored within the database server 130. The identification application is capable of capturing data parsed by the card swipe application 116 and matching this data to information stored in the database server 130. The identification application 128 uses the match to positively identify the user 102. This identification is then used by the offer application 126.

The offer application 126 is used to provide the positively identified user with an offer that is specific to the identified user. The offer application 126 captures the match identified by the identification application 128 and uses the match to search the database server 130 for any pre-approved offer associated with the user 102. Once located, the offer application 126 can retrieve the user-specific offer.

The acceptance application 127 is used to store information authorizing a given transaction or any data related to the authorization. As previously described, such information forms a data signature. The acceptance application 127 can receive a data signature from the user terminal 110 and store this data signature in the database server 130 for future access. Conversely, the acceptance application 127 is also configured to search the database server 130 for the data signature and retrieve it.

Referring again to FIG. 3, the database server 130 generally includes a communication device 131, a processing device 132, and a memory device 133. The processing device 132 is operatively coupled to the communication device 131 and the memory device 133. The processing device 132 uses the communication device 131 to communicate with the network 105 and other devices on the network 105, including but not limited to, the application server 120 and the user terminal 110. As such, the communication device 131 generally comprises a modem, server, or other device for communicating with other devices on the network 105.

The database server 130 further contains computer-readable program instructions stored in the memory device 133, which includes the computer-readable instructions of a data storage application 135. The data storage application 135 is used to store data captured from any of the communication methods recognized by the communication device 131 in a secure location for later access. The data storage application 135 retains data of a variety of types, but most importantly, the application retains an offer table 136, account table 137, and signature table 138.

Each table is comprised of financial information arranged in matrix form wherein the financial information is broken into categories and stored accordingly, and each table can be searched according to category. The account table 137 includes data relating to financial accounts held by the financial institution. Each account is stored according to account numbers and includes information including but not limited to account holder names, social security numbers, transaction histories, account balances, and any other like information. The offer table 136 stores similar information. The offer table 136 stores data relating to financial accounts held by a financial institution, wherein each account is stored according to an account number. The offer table 136, however, stores pre-approved transactional offers that correspond to each account number. Finally, the signature table 138 stores data signatures. As previously described, a data signature includes information that can be used verify the identity of the user accepting and authorizing a transaction and information identifying the particular circumstances surrounding the acceptance and authorization.

Figure 4:
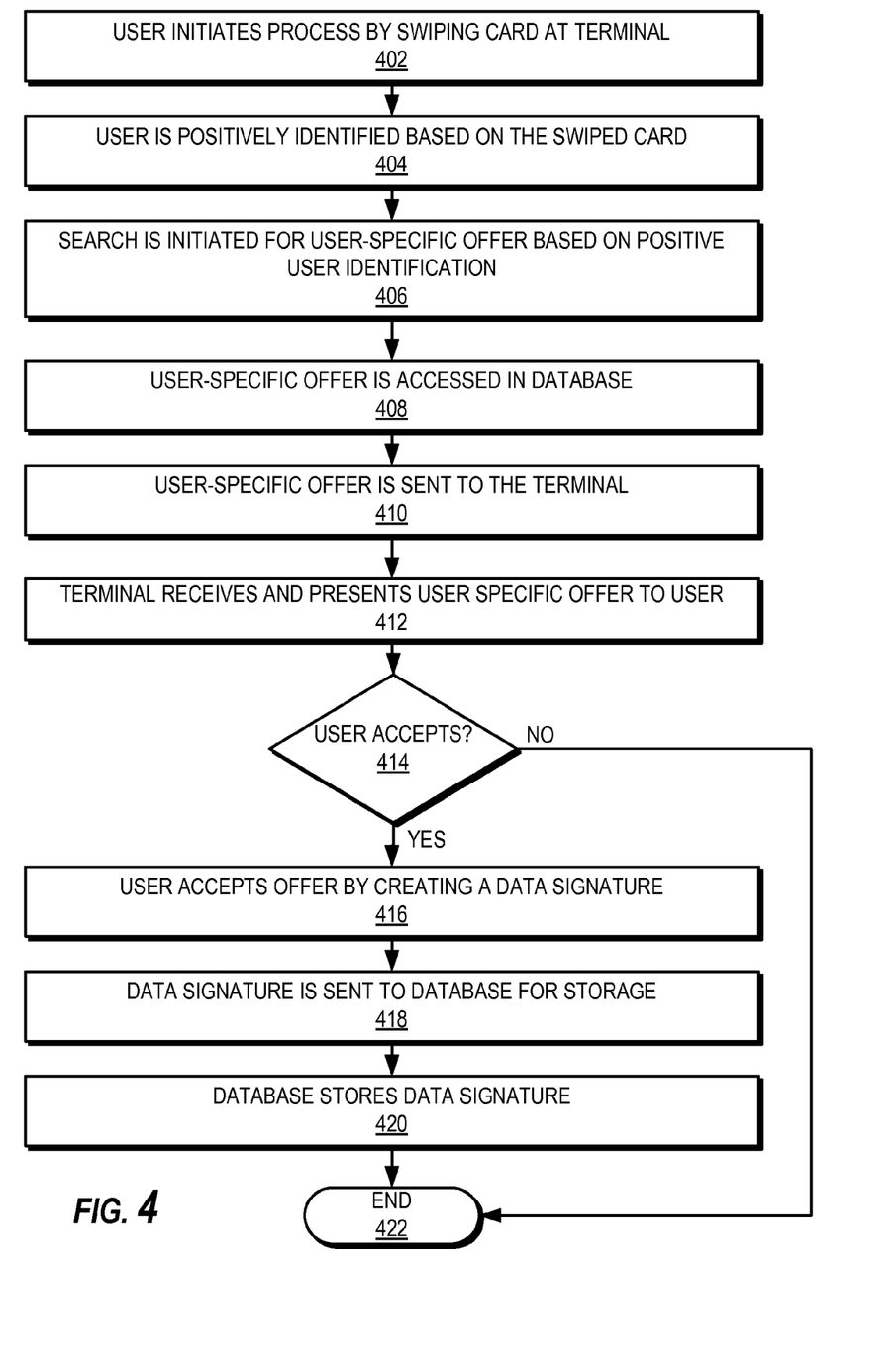
FIG. 4 is a flow diagram more specifically illustrating a process for offering and accepting user specific offers, in accordance with an embodiment of the invention.

Moving on to the next figure, FIG. 4 is a flow diagram illustrating a specific process 400 for offering a user-specific offer to the user 102 and storing the acceptance and validation (data signature) related to the offer in a database. As with process 200 of FIG. 2, process 400 of FIG. 4 is, in one embodiment, implemented by various devices in the operating environment 100 described in FIG. 3. In other embodiments, however, the process 400 of FIG. 4 is implemented by a single computer that both contains the specific offer and stores the data signature in a centrally located data store.

Process 400 of FIG. 4 begins as the user 102 initiates the transaction process by swiping his card at a terminal, as is represented by block 402. As was described above, the user 102 swipes his or her card through the card reader device. The card reader device is associated with the input/output interface 117 of the user terminal 110. Once the card has been swiped, the card swipe application 116 can interpret the data inputted into the user terminal 110 through the input/output interface 117.

Process 400 then continues to block 404 where the user 102 is positively identified based on the swiped card. Once the card swipe application 116 interprets the card data, the identification application 128 of the application server 120 is initiated. The identification application 128, as described above, uses the information from the card to match a particular account stored in the account table 137 of the database server 130. The identification application 128 can actively search the account table 137 of the database server 130 for data pieces that exactly match the data pieces identified by the card swipe application. Once matched, process 400 moves on to the next block.

In block 406 of process 400, a search for a user-specific offer is initiated based on the positive user identification. The offer application 126 of the application server 120 begins working after the identification application 128 has successfully identified the user 102 in block 404. The offer application 126 takes the positive match produced in block 404 and searches the offer table 136 of the database server 130 for a pre-approved offer corresponding to the positively identified user.

Once the corresponding offer has been located by the offer application 126, the offer application 126 accesses the offer in block 408 before sending the offer back to the terminal in block 410. In block 412 of process 400, the terminal receives and displays the user-specific offer to the user identified in process block 404. After the user-specific offer has been displayed to the user 102, process 400 flows to decision block 414 where the user 102 decides whether or not to accept the presented offer. If the user 102 does not accept the offer, then the process ends at block 422. If, however, the user 102 decides to accept the offer, process flows to block 416.

Process 400 continues in block 416 where the user 102 accepts the user-specific offer by creating a data signature. As described previously, the user 102 can at least partially create the data signature by signing a digital signature onto a touch screen using a digital pen, entering a user-specific PIN, or any similar action. The second portion of the data signature, which includes various information including but not limited to the date, time, location, terminal number, address, and/or branch number, is recorded automatically at the time the user 102 authorizes the transaction.

In process block 418, the data signature is sent to the signature table 138 of the database server 130 for storage. Upon authorization of the user-specific offer by the user 102, the acceptance application 126 obtains the data signature and transfers the data to the signature table 138 where it is stored in process block 420. After storage, process 400 ends at process block 422.

Figure 5:
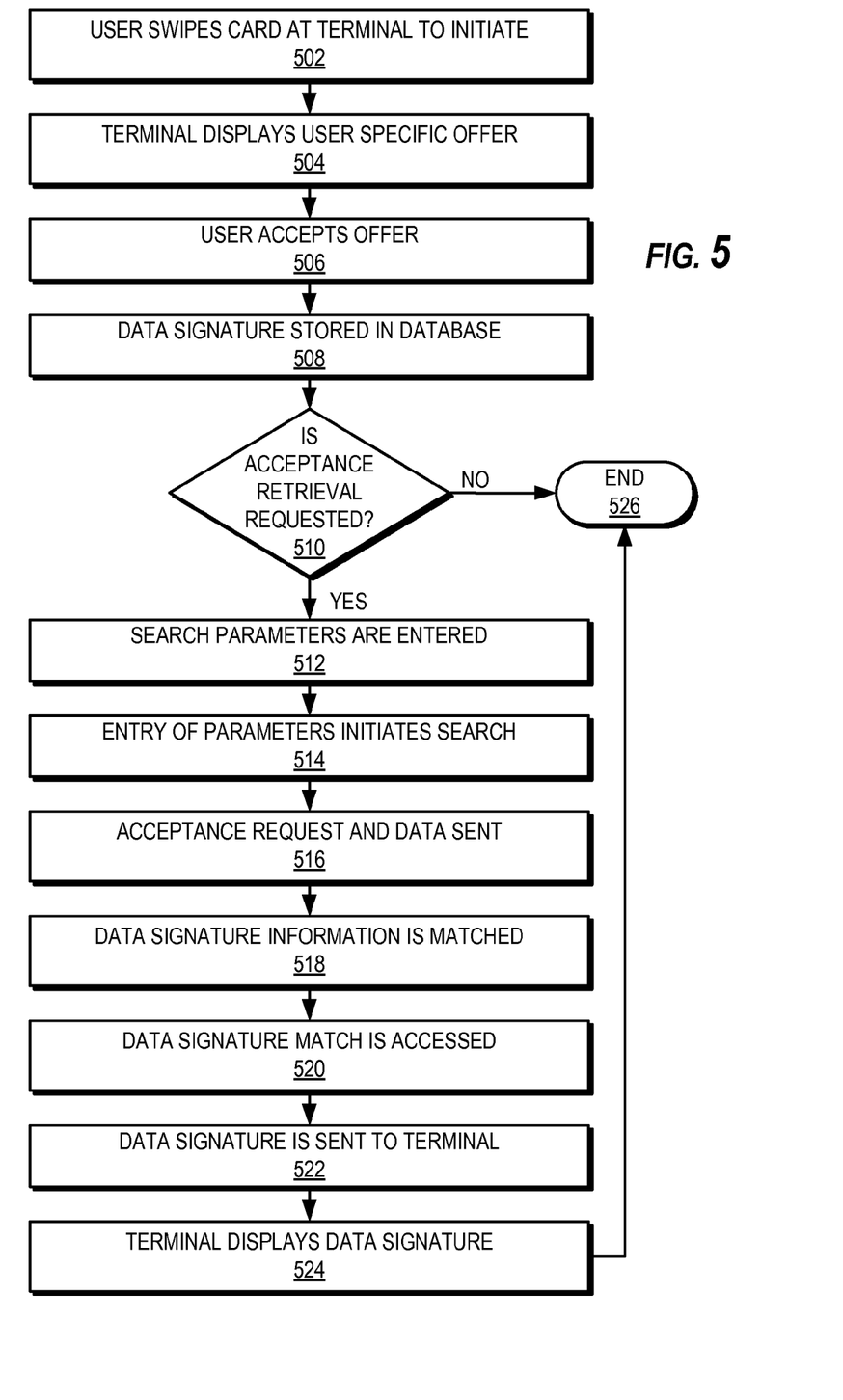
FIG. 5 is a flow diagram generally illustrating a process for retrieving a stored user acceptance, in accordance with an embodiment of the invention.

FIG. 5 provides a flow diagram illustrating the process for retrieving a data signature that represents an acceptance and authorization for a user-specific offer from the signature table 138, in accordance with an example embodiment of the invention. As with previous figures, process 500 of FIG. 5 is, in one embodiment, implemented by various devices in the operating environment 100 described in FIG. 3. In other embodiments, however, the process 500 of FIG. 5 is implemented by a single computer that both contains the specific offer and stores the acceptance in a centrally located data store.

Process 500 of FIG. 5, begins in process block 502 where the user 102 swipes his identification card at a terminal to initiate the offer system, as was described above. Following initiation of the process, in block 504 the terminal displays the user-specific offer that corresponds to the card swiped in the previous block. In process block 506, the user 102 accepts and authorizes the user-specific offer, creating a data signature and in block 508, the data signature is stored in the signature table 138.

Process 500 then moves to decision block 510 where the acceptance retrieval process may be initiated. As described above, a data signature is stored in the data server 130 in order to maintain electronic records of the authorization and acceptance of user-specific offers. The acceptance application 127 that routes and stores the data signature in the database server 130 is also capable of searching and retrieving the stored data signatures if desired. From decision block 510, if retrieval of a data signature is not requested, then the process 500 concludes at block 526. If, however, authorization verification is requested, then process 500 continues in block 512.

In process block 512, the acceptance search of the database server 130 begins when search parameters are entered. As detailed above, the data signature is stored in the signature table 138. In one embodiment, each data signature includes authorization data and transaction data and is stored accordingly. In order to begin a search, the user 102 specifies what data signature(s) are to be located. For example, if the user 102 would like to locate a particular data signature, then the user 102 may choose to enter a customer or account number along with the date, location, type, or any other similar aspect of the desired transaction. In the alternative, the user 102 could simply enter a customer or account number in order to retrieve every data signature related to the given customer or account number. The user 102 may enter the desired search parameters via the input/output interface 117 of the user terminal 110.

Process 500 then proceeds to block 514 where the search is initiated. As described above, the acceptance application 127 is capable of searching and retrieving stored data signatures from the signature table 138. Once the parameters are entered in block 512, the acceptance application 127 of the application server 120 is activated and process 500 continues to process block 516. Process block 516 illustrates that the acceptance application 127 receives the acceptance request and parameter data after activation. With this information, the acceptance application 127 can carry out its search function as illustrated by process block 518.

In process block 518, the acceptance application 127 uses the received parameter data to locate the desired data signature in the signature table 138. The acceptance application 127 searches the signature table 138 of the database server 130 for entries matching the parameter data entered by the user 102. For a broad search, the acceptance application 127 can match a given customer or account number to multiple data signature entries in the signature table 138. The acceptance application 127 can also match targeted parameter data to a single data signature in similar example.

Once the data signature has been matched the parameter data, the acceptance application 127 can access the data signature in process block 520. The accessed data signature is then sent to the terminal in block 522, where it is displayed to the user 102 in block 524. Upon display, process 500 ends in block 526.

As will be appreciated by one of skill in the art, the present invention may be embodied as a method (including, for example, a computer-implemented process, a business process, and/or any other process), apparatus (including, for example, a system, machine, device, computer program product, and/or the like), or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product on a computer-readable medium having computer-executable program code embodied in the medium.

Any suitable computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

Computer-executable program code for carrying out operations of embodiments of the present invention may be written in an object oriented, scripted or unscripted programming language such as Java, Perl, Smalltalk, C++, or the like. However, the computer program code for carrying out operations of embodiments of the present invention may also be written in conventional procedural programming languages, such as the "C" programming language or similar programming languages.

Embodiments of the present invention are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the invention.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. An apparatus comprising:
   a machine-readable code reader configured to read machine-readable code from a user's payment device, the machine-readable code identifying a particular person or account;
   a user output device configured to present information to the user;
   a user input device configured to receive the user's electronic signature;
   a memory device configured to store data therein;
   a second user input device configured to receive search data and
   a second user output device; and
   a processing device operatively coupled to the machine-readable code reader, the user output device, the user input device, the memory device, the second user input device and the second user output device, where the processing device is configured to:
     identify a pre-approved offer based on the machine-readable code read by the machine-readable code reader;
     use the user output device to present the pre-approved offer to the user;
     receive an indication of the user's acceptance of the pre-approved offer from the user input device;
     receive the user's electronic signature from the user input device;
     store the electronic signature in the memory device and associate the stored electronic signature with first data related to the pre-approved offer and second data related to the user's acceptance of the pre-approved offer;
     receive the search data from the second user input device;
     identify one or more electronic signatures in the memory device based on and corresponding to the received search data; and
     use the second user output device to present to the user the identified electronic signatures, and the first data and second data associated with the identified electronic signatures.

2. The apparatus of claim 1, wherein the machine-readable code reader comprises a card reader and wherein the user's payment device comprises a credit or debit card.

3. The apparatus of claim 1, wherein the indication of the user's acceptance of the pre-approved offer comprises the user's electronic signature.

4. The apparatus of claim 1, wherein the user input device comprises a touchscreen or touchpad, and wherein the processing device is configured to receive the user's electronic signature by digitizing the user's signature written on the touchscreen or touchpad.

5. The apparatus of claim 1, wherein the processing device is configured to receive the user's electronic signature by receiving and verifying a personal identification code entered by the user through the user input device.

6. The apparatus of claim 1, wherein, in response to receipt of the indication of the user's acceptance of the pre-approved offer, the processing device is configured to use the user output device to prompt the user to enter the user's electronic signature.

7. The apparatus of claim 1, wherein the pre-approved offer comprises a pre-approved credit card offer.

8. The apparatus of claim 1, wherein the other data related to the pre-approved offer and the user's acceptance of the pre-approved offer comprises information about a date, time, or location of the user's acceptance or information about a device used to input the user's acceptance or the user's electronic signature.

9. The apparatus of claim 1, further comprising a terminal at a banking center, the terminal comprising the machine-readable code reader, the user input device, and the user output device.

10. A method comprising:
   receiving, at a machine-readable code reader, a machine-readable code from a user's payment device;
   identifying, using a processor, a pre-approved offer based on the machine-readable code;
   using a user output device to present the pre-approved offer to the user;
   receiving an indication of the user's acceptance of the pre-approved offer;
   receiving, at a user input device, the user's electronic signature;
   storing the electronic signature in a memory device and associating the stored electronic signature in the memory device with first data related to the pre-approved offer and second data related to the user's acceptance of the pre-approved offer;
   receiving search data from a second user input device;
   identifying one or more electronic signatures in the memory device based on and corresponding to the received search data; and
   using a user output device to present to the user the identified electronic signatures, and the first data and second data associated with the identified electronic signatures.

11. The method of claim 10, wherein the user's payment device comprises a credit or debit card.

12. The method of claim 10, wherein receiving the user's electronic signature comprises digitizing the user's signature written on a touchscreen or touchpad.

13. The method of claim 10, wherein receiving the user's electronic signature comprises receiving and verifying a personal identification code entered by the user through a keypad or touchscreen.

14. The method of claim 10, further comprising, in response to receiving the indication of the user's acceptance of the pre-approved offer:
   prompting the user to enter the user's electronic signature.

15. The method of claim 10, wherein the pre-approved offer comprises a pre-approved credit card offer.

16. The method of claim 10, wherein the other data related to the pre-approved offer and the user's acceptance of the pre-approved offer comprises information about a date, time, or location of the user's acceptance or information about a device used to input the user's acceptance or the user's electronic signature.

17. A computer program product comprising a computer readable storage medium, the computer readable storage medium comprising computer executable program code stored therein, wherein the computer executable program code comprises:
   a first executable portion configured to receive a machine-readable code from a user's payment device;
   a second executable portion configured to identify a pre-approved offer based on the machine-readable code;
   a third executable portion configured to present the pre-approved offer to the user;
   a fourth executable portion configured to receive an indication of the user's acceptance of the pre-approved offer from the user input device;
   a fifth executable portion configured to receive the user's electronic signature;
   a sixth executable portion configured to store the electronic signature in a memory device and associate the stored electronic signature with first data related to the pre-approved offer and second data related to the user's acceptance of the pre-approved offer;
   a seventh executable portion configured to receive search information;
   an eighth executable portion configured to identify one or more electronic signatures in the memory device based on and corresponding to the received search information; and
   a ninth executable portion configured to initiate presentation to the user of the one or more electronic signatures, and the first data and second data associated with the identified electronic signatures.

* * * * *